May 20, 1930.　　　G. S. EVANS　　　1,759,347
IRON REFINING
Filed Feb. 18, 1928
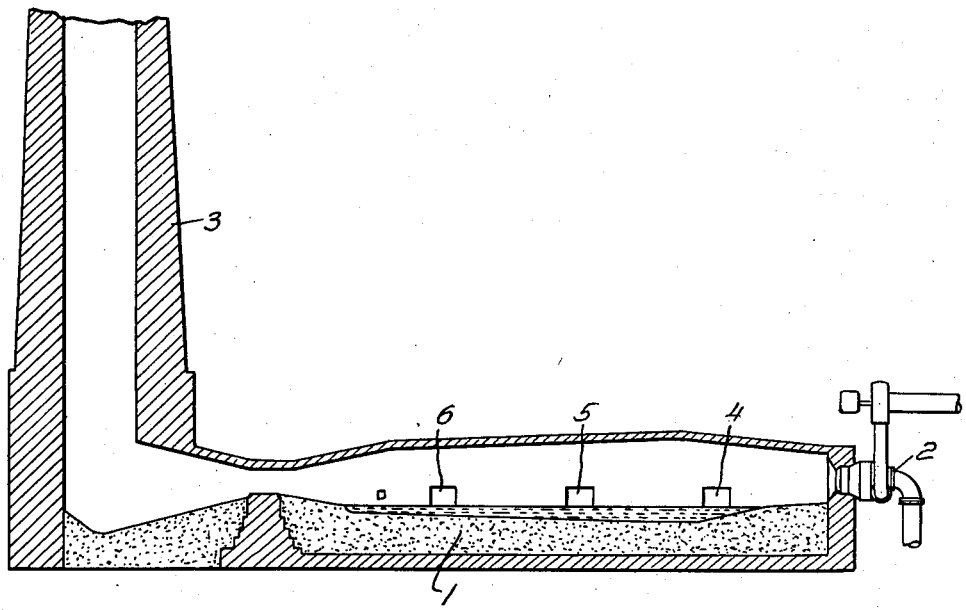
INVENTOR
George S. Evans
BY
Pennie, Davis, Marvin & Edmonds
ATTORNEYS Patented May 20, 1930

1,759,347

UNITED STATES PATENT OFFICE

GEORGE S. EVANS, OF BRONXVILLE, NEW YORK, ASSIGNOR TO THE MATHIESON ALKALI WORKS, OF NEW YORK, N. Y., A CORPORATION OF VIRGINIA

IRON REFINING

Application filed February 18, 1928. Serial No. 255,268.

This invention relates to improvements in the operation of air furnaces used for melting iron and steel, for example, in the operation of air furnaces as used in the production of malleable iron castings.

Soda ash, or refining agents of which soda ash is the principal active component, has been in quite general use for some time past in the refining of iron. Several attempts to use soda ash refining agents in air furnace operations have been made, but these attempts have not been entirely successful. In particular, one of the difficulties encountered has been the relatively large amounts of such refining agents required in the operations that have been proposed, this amount usually exceeding 15 to 20 lbs. per ton of metal. This invention provides an improved operation which materially reduces the amount of such refining agents required and which has several further important advantages.

In carrying out the present invention, after the furnace charge has been melted down, the slag formed during melting down of the metal is skimmed off and a soda ash refining agent is then added to the metal bath near the firing end of the furnace. The added soda ash refining agent is allowed to melt down to form a refining slag on the metal bath and this slag is caused to flow, under the action of the draft through the furnace, from the firing end to the stack end of the furnace over the metal bath. Intermixture of the melting down slag and the refining slag is thus avoided. The refining slag is held in contact with the metal bath for a sufficient period of time to bring the metal to the desired state of purity; this period of contact may be prolonged by rabbling back the slag at a midpoint in the furnace between the firing end and the stack end. The period of contact, however, should not be too long. The refining slag is with advantage, skimmed off of the metal bath before the metal is tapped, particularly where the added soda ash refining agent includes limestone; but in some cases the refining slag may be left on the metal as it is tapped and discharged through the tap-hole after the last of the metal is drawn.

In carrying out this invention, a soda ash refining agent is with advantage added to the slag formed during melting down of the metal before this initial slag is skimmed off. Such addition may be made to the initial charge of metal or shortly after the initial charge of metal is melted down. Such preliminary addition of the refining agent facilitates thorough removal of the slag formed during melting down of the metal and also assists in minimizing intermixture of such slag with the refining slag proper.

In the improved operation of the invention the refining slag used is particularly effective as a de-oxidizing agent, in the removal of entrained siliceous matter and oxide slag inclusions and as a de-sulphurizing agent.

The accompanying drawing illustrates, diagrammatically and conventionally, an air furnace adapted for carrying out the improved process of the invention. The drawing shows this one form of air furnace in a fragmentary vertical section. The improved operation of the invention will be further and in more detail described as carried out in an air furnace of this type, but it is intended and will be understood that this further and more detailed description is by way of exemplification.

The air furnace illustrated, comprises a hearth 1, a burner 2 for pulverized coal arranged at the firing end of the furnace and a stack 3 arranged at the other end of the furnace. Doors 4, 5 and 6 are provided for skimming off slag for making additions of refining agents, and to permit rabbling of slag over the metal bath on the furnace hearth.

In carrying out the invention in the air furnace illustrated, a charge of metal is melted down, the refining operation of the invention is carried out and the refined molten metal is then tapped from the furnace for casting. During the melting down a slag forms on the metal bath, from oxides present in the metal and usually in part from fused portions of the furnace lining, this slag normally being of an acidulous character.

To facilitate removal of this initial slag, a soda ash refining agent is with advantage added to the initial charge or shortly after melting down of the metal and before skimming of this initial melting down slag. The addition of soda ash to this slag assists furnace operation in reducing the viscosity of the slag but, due to the acidulous character of the slag, the effectiveness of such added soda ash as a refining agent is materially reduced by reaction with the slag as well as by dilution with the slag. The slag formed during melting down of the metal after any such preliminary addition of soda ash, is skimmed from the metal bath as thoroughly as possible and a soda ash refining agent is added to the clean metal bath after thorough removal of this acidulous initial slag to form a refining slag. The draft through the furnace causes slags on the metal bath to move from the firing end to the stack end; thus in carrying out this invention, the refining slag is carried over the metal bath and any intermixture of the refining slag with any of such acidulous slag that may remain on the metal bath after skimming or formed thereafter is minimized, such acidulous slag being carried by the same action across the metal bath in advance of the refining slag. Preliminary addition of the refining agent to the initial slag also facilitates this action. To prolong the period of contact between the metal bath and refining slag, the refining slag may be rabbled back towards the firing end of the furnace at some intermediate point. With the usual furnace construction, such rabbling back of the refining slag not only increases the total period of contact between the refining slag and the metal bath but also increases, relatively, the period during which the refining slag is maintained over the deeper portions of the bath of molten metal. In the air furnace illustrated, after the slag formed during melting down of the metal has been skimmed off, the soda ash refining agent may be added through door 4, rabbling back of the refining slag may be carried out through door 5, and the refining slag may be skimmed off through door 6. Similarly, preliminary additions of the refining agent may be made through door 4.

In carrying out the invention, fused soda ash is advantageously used in cast blocks of definite weight. The soda ash refining agent may, however, be otherwise compacted to facilitate addition to the metal bath, for example, by briquetting. The soda ash refining agent used may consist essentially of soda ash, or it may include, for example, 10 to 25 or 35% of ground limestone. In general, in carrying out the invention, additions of 4, 8 or 10 lbs. of soda ash per ton of metal are sufficient to form the refining slag proper. Preliminary additions of soda ash, for example, may amount to 2 to 6 lbs. per ton of metal. The reaction between the refining slag and the metal bath usually continues quite active for 8 to 12 or 15 minutes after the addition of the soda ash refining agent, and such period of time is usually sufficient for the refining operation. The average period of contact between the refining slag proper and the metal bath is with advantage limited, in most cases, not to exceed 9 to 12 minutes.

The following analyses of slag and metal samples will illustrate the course of one such operation in which 10 lbs. of soda ash per ton of metal were added to a thirty ton charge of molten iron after thorough skimming of the initial slag, in accordance with the invention:

| Analysis of iron samples | Before adding | Minutes after adding soda ash | | | |
|---|---|---|---|---|---|
| | | 3 min. | 6 min. | 9 min. | 12 min. |
| Silicon_____% | .92 | .85 | .82 | .85 | .79 |
| Manganese_____% | .34 | .27 | .27 | .27 | .26 |
| Phosphorus_____% | .149 | .157 | .157 | .157 | .137 |
| Carbon_____% | 2.38 | 2.26 | 2.27 | 2.43 | 2.29 |
| Sulphur_____% | .090 | .077 | .052 | .055 | .059 |
| Sulphur reduction_____% | -------- | 15 | 42 | 39 | 35 |
| *Analysis of slag samples* | | | | | |
| Silica (SiO$_2$)_____% | 60.56 | 50.16 | 49.40 | 56.05 | 47.96 |
| Mang. sulphide (MnS)__% | .23 | -------- | -------- | -------- | 2.95 |
| Iron oxide (Fe$_2$O$_3$)_____% | 15.88 | 4.45 | 4.40 | 4.84 | 3.96 |

The following analyses will illustrate the course of another such operation in which 10 lbs. of soda ash and 5 lbs. of limestone per ton of metal were added to a thirty ton charge of molten iron after thorough skimming of the initial slag, in accordance with the invention:

| Analysis of iron samples | Before adding | Minutes after adding soda ash | | | |
|---|---|---|---|---|---|
| | | 3 min. | 6 min. | 9 min. | 12 min. |
| Silicon_____% | .99 | .90 | .90 | .93 | .90 |
| Manganese_____% | .34 | .32 | .32 | .33 | .30 |
| Phosphorus_____% | .157 | .160 | .157 | .170 | .152 |
| Carbon_____% | 2.38 | 2.41 | 2.43 | 2.60 | 2.44 |
| Sulphur_____% | .095 | .086 | .080 | .068 | .071 |
| Sulphur reduction_____% | -------- | 10 | 16 | 28 | 25 |
| *Analysis of slag samples* | | | | | |
| Silica (SiO$_2$)_____% | 61.64 | 46.64 | 47.04 | 50.92 | 50.80 |
| Mang. sulphide (MnS)__% | .43 | 4.03 | 4.01 | 3.91 | 3.99 |
| Iron oxide (Fe$_2$O$_3$)_____% | 14.08 | 4.84 | 5.28 | 6.00 | 7.20 |

In the operation of the invention, the refining slag, formed by the addition of the soda ash refining agent after skimming off the slag formed during melting down of the metal, is caused to flow over the metal bath from the firing end to the stack end of the furnace at a rate which may vary in different operations but which is definite in any particular operation. Thus, by providing for control of the rate of this passage of the refining slag over the metal bath, the invention provides the control requisite to secure best results in any particular operation. This passage of the refining slag over the metal bath also makes the soda ash refining agent used therein more effective as a refining agent.

The invention makes possible a substantial reduction in the sulphur content and in the content of oxide impurities of the cast metal, and similarly makes possible the use of cheaper fuel without increase in the sulphur content of the cast metal. The invention also makes possible a reduction in the weight of the gates and risers for the castings poured and an improvement in the machinability of the castings. The time and temperature requisite for annealing the castings produced may also be decreased. The time of heat from charging of the furnace to tapping of the molten charge may be reduced. From the practical standpoint, the several advantages of the invention makes possible a reduction in cost of the molten metal as poured, an increased production of marketable castings per ton of molten metal and an improvement in the quality of the castings produced.

In operations in which the heat is tapped from the air furnace into large bottom-pour ladles, a further addition of soda ash refining agent may be made to the metal in such ladles and the metal held in contact with the refining slag so formed for a sufficient period, say 7 to 15 minutes or until the reaction is complete, to permit this slag to be effective in the removal of impurities.

I claim:

1. In the operation of air furnaces for melting iron and steel, the improvement which comprises, after melting down the metal and before tapping, skimming off the slag formed during melting down of the metal, thereafter adding a soda ash refining agent directly to the metal bath near the firing end of the furnace, and flowing the resulting refining slag over the metal bath to the stack end of the furnace.

2. In the operation of air furnaces for melting iron and steel, the improvement which comprises adding a soda ash refining agent to the slag formed during melting down of the metal to facilitate its removal, skimming off this slag, thereafter adding a soda ash refining agent directly to the metal bath near the firing end of the furnace, and flowing the resulting refining slag over the metal bath to the stack end of the furnace.

In testimony whereof I affix my signature.

GEORGE S. EVANS.